United States Patent
Su et al.

(10) Patent No.: US 7,472,232 B2
(45) Date of Patent: Dec. 30, 2008

(54) METHOD AND RELATED APPARATUS FOR INTERNAL DATA ACCESSING OF COMPUTER SYSTEM

(75) Inventors: Andrew Su, Taipei Hsien (TW); Jiin Lai, Taipei Hsien (TW); Chad Tsai, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 308 days.

(21) Appl. No.: 11/162,407

(22) Filed: Sep. 9, 2005

(65) Prior Publication Data

US 2006/0085606 A1    Apr. 20, 2006

Related U.S. Application Data

(60) Provisional application No. 60/522,593, filed on Oct. 19, 2004.

(51) Int. Cl.
*G06F 12/00*    (2006.01)

(52) U.S. Cl. ..................... 711/146; 711/148; 711/167

(58) Field of Classification Search ................. 711/146
See application file for complete search history.

(56) References Cited

U.S. PATENT DOCUMENTS

| | | | | |
|---|---|---|---|---|
| 5,822,611 | A | * | 10/1998 | Donley et al. ................ 710/6 |
| 2004/0103248 | A1 | * | 5/2004 | Hass et al. ................ 711/117 |
| 2004/0172493 | A1 | * | 9/2004 | Askar ........................ 710/305 |

* cited by examiner

*Primary Examiner*—Matt Kim
*Assistant Examiner*—Hetul Patel
(74) *Attorney, Agent, or Firm*—Winston Hsu

(57) ABSTRACT

Method and related apparatus for internal data accessing of a computer system. In a computer system, a peripheral can issue accessing requests for system memory space with or without snooping the central processing unit (CPU). While serving a peripheral of single virtual channel utilizing a chipset supporting multiple virtual channels, the present invention assigns accessing requests to different processing queues according to their snooping/non-snooping attributes, such that reading/non-snooping requests are directly routed to a system memory. Also responses from system memory and CPU are buffered in the chipset respectively by utilizing buffer resources of different virtual channels. And by applying accessing routing dispatch, data accessing efficiency can be increased.

4 Claims, 9 Drawing Sheets

METHOD AND RELATED APPARATUS FOR INTERNAL DATA ACCESSING OF COMPUTER SYSTEM

CROSS REFERENCE TO RELATED APPLICATIONS

This application claims the benefit of U.S. Provisional Application No. 60/522,593, filed Oct. 19, 2004, and included herein by reference.

BACKGROUND OF THE INVENTION

1. Field of the Invention

The present invention relates to a method and related apparatus for internal data accessing of a computer system; more particularly, to a method and related apparatus for assigning data accessing requests to various data access paths according to their snooping and non-snooping attributions.

2. Description of the Prior Art

A computer system is an important and basic hardware appliance in our modern information society. Improving the efficiency of today's computer system is a priority for manufacturer's research and development endeavors. In general, a computer system includes a central processing unit (CPU), a system memory, a chipset and various types of peripheral devices and circuits. The CPU is designed for and capable of controlling all operations of the computer system by performing operations, processing data and executing program's instructions. The system memory provides system memory space for data storing and information involved in the operation of the CPU and the whole computer. A large number of peripherals are available for the computer system, including but not limited to: display cards for processing image display prior to output; a network card for processing network connections and other storage devices. The chipset is capable of managing data transmission and exchanges allowing the peripheral, the system memory and the CPU to interact. Since the chipset manages and services all of the data accessing requests of each peripheral, each peripheral accesses the system memory space by asking an access request to the chipset. During accessing the request, the peripheral indicates a specific desired address of the system memory space to access the required data. The chipset will then arrange these addresses into an address queue, which stores addresses requested by various peripherals. In response to the data accessing request, the requested data (e.g., data accessed from the system memory space) will be temporarily stored in a buffer of the chipset for later transmitted to the appropriate peripheral accordingly.

The efficiency of the chipset can be improved during the steps of managing the peripheral accessing data. The modern chipset has a mechanism of multiple virtual channels (VCs). For the VCs mechanism, only a physical channel is required to support multiple VCs. The chipset is capable of receiving and processing various data accessing request respectively through these VCs. This is equivalent to receiving and processing shared independent (non-interference) accessing requests through different virtual channels. For example, the standards defined in the peripheral components interconnection express (PCI-E) specification include the basic structure having multiple VCs set-up. However, to support the mechanism of multiple VCs, it is necessary to include and set-up additional circuits on the chipset. For example, there is a need for the chipset to set-up independent buffers for the multiple VCs to buffer the data and information on the different VCs respectively. Similarly, to fully utilize the mechanism of multiple VCs, the peripheral itself must support multiple VCs to perform data accessing.

In the development of the conventional peripheral, which mostly devices and circuits can only support a single VC. This is inefficient because the chipset is capable of supporting multiple VCs while the peripheral is operated under a single VC environment. Since the peripheral is still unable to realize the high efficient data accessing through multiple VCs, the additional chipset hardware that supports multiple VCs is idle.

A conventional method of a chipset with multiple VCs serves peripherals with a single VC. The method combines buffers of each different multiple VCs in serial to a larger buffer. As the peripheral receives a response of the accessing request, the response data and information can be temporarily stored into one of the buffer of a VC. If the storage space of the buffer is full, then another buffer of a next VC will be used to continuously store the response data and information, and so forth.

The above-mentioned method has disadvantages of improving the performances, because the above mentioned method can only increase the additional buffer of the chipset. For example, when the space of the address queue is limited, as the mention above, if the chipset processes an accessing request of the peripherals, the requests will firstly be arranged into the address queue. Then the accessing request is performed sequentially according to the addresses in the address queue. The response is then buffered in the buffer and transmitted back to the peripheral. If space utilized to keep the address queue is limited, the chipset can serve only a limited amount of access requests even though each buffer of the different multiple VCs is combined in serial into a larger buffer space for buffering the responses of accessing requests. Again, the efficiency of the chipset is not improved.

SUMMARY OF THE INVENTION

The invention provided an efficient method and related apparatus for data accessing such that a chipset that is capable of supporting multiple virtual channels (VCs) can fully utilize its hardware resources to serve a single virtual channel peripheral and to improve on efficiency of data accessing.

In general, a modern central processing unit (CPU) has cache memory installed; during operation of the CPU, the CPU is able to store some data/calculation in system memory into the cache such that the CPU can utilize the data/calculation of the cache directly without accessing from the system memory. For example, when the CPU needs to process data of an address in the system memory, the CPU first stores the data of the address into the cache so that the CPU can process the data of the address directly via the cache. If content of the data needs to be updated after processing, the CPU is also able to update the data content of the address in the cache directly. But this will cause the data of the system memory and the cache to be inconsistent as the data content of the address in the cache is valid and current, and has been updated but the data content of the address in the system memory is still not updated. At this time, when the peripheral requests the chipset to access the data of the address, the data accessed may be the old invalid data that is inconsistent with the correct and latest version still residing in the cache. Therefore when the peripheral requests the chipset to perform an access, the peripheral can specify whether or not to perform a snoop on the CPU. If the peripheral requests the chipset to access data of an address and to perform a snoop, the chipset will transmit the address to the CPU. The CPU then checks whether the data of the address has been stored into the cache. If the data of the address has already been stored into the cache the CPU will then access the data from the address from the cache and sends a response to the chipset. On the other hand, if the data of the address is not stored into the cache, the CPU will dispatch an access cycle to the system memory so that the system memory will access the data of the address and sends a response back to the chipset.

A snoop is performed on the CPU to check the cache when accessing data. The latest data can be accessed but it also lowers the speed of accessing data. When snooping the CPU, if the data already existed in the cache, although the data can be accessed directly from the cache, with comparing to accessing the system memory, latency in accessing the cache will be longer and it has a low efficiency. On the other hand, if the data does not exist in the cache after snooping the CPU, the CPU needs to assign an access cycle to the system memory. In this detouring process of the CPU accessing the system memory, it eventually consumes more time than accessing the system memory directly. In practice, there are also many situations that do not require snooping when accessing data. For example, when a peripheral such as a display card accesses the system memory space, most accessing requests do not require snooping. In the invention of a multiple virtual channels (VCs) chipset serving a single virtual channel peripheral, it utilizes each buffer of the multiple VCs to buffer responses received from the CPU and the system memory according to whether the peripheral specifies to perform a snoop to allocate/order/process access requests.

In other words, when a single VC peripheral assigns an access request, the invention is capable of allocating access request according to whether the access request requires a snoop on the CPU. If an access request is to read data of an address in the system memory and a snoop is not needed, the invention places the address into a predetermined address queue so that the address in the queue can be directly transmitted to the system memory. On the other hand, if the accessing request of the peripheral is another type of data accessing (for example a need to snoop reading or writing data of the CPU), the address of the data accessing is placed into another address queue, and the address in the queue is transmitted to the CPU for performing a snoop and a check on the cache. When the CPU or the system memory receives a response after performing the data accessing, the invention utilizes the buffer of different VCs to buffer the responses from different components: the buffer of one VC is utilized to buffer the response from the CPU, and the buffer of another VC is utilized to buffer the response from the system memory, and finally, the buffers is combined and transmitted back to the peripheral.

The conventional chipset is only capable of maintaining a single address queue to place data addresses of access requests into a single address queue, and to combine the addresses to transmit to the CPU to perform a snoop regardless of which peripheral requests a snoop. Because the process of data accessing has to pass through the CPU to the system memory (if data accessed by the peripheral is not yet stored into the cache), the efficiency of data accessing is lower.

In comparison, the chipset of the invention is capable of utilizing two address queues according to whether or not to perform a snoop to allocate different data accessing address into different address queue, the data accessing address that need to be snooped is transmitted to the CPU to perform a snoop; whereas the data accessing address without snooped is transmitted directly to the system memory. The system memory receives a response quickly such that the access request can be processed quickly without detouring to the CPU. Furthermore, the responses generated by the CPU and the system memory are temporarily stored in the buffer of the different VCs, if the system memory transmits the response to the buffer first, the claimed invention is capable of transmitting the response directly to the peripheral to increase the efficiency of data accessing in the system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
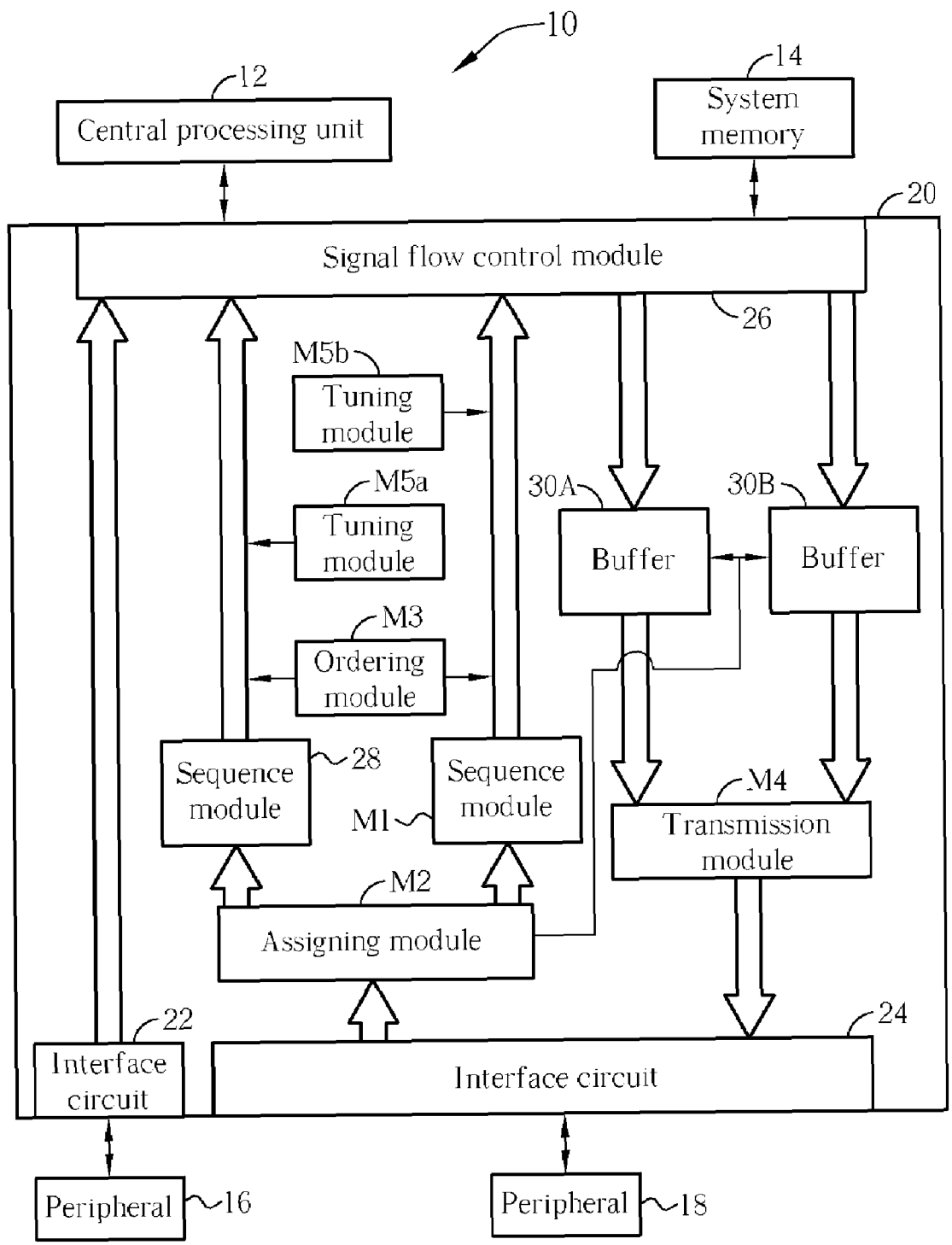
FIG. 1 illustrates a functional block diagram of the present invention.

Please refer to FIG. 1. FIG. 1 illustrates a functional block diagram of a computer system 10 according to an embodiment of the present invention.

The computer system 10 includes: a central processing unit (CPU) 12 for executing programs, operations and processing data; a system memory 14, which can be a dynamic access random memory (DRAM), for temporarily storing the programs, data and figures needed by the computer system during operation to provide memory space; peripheral devices (represented as peripheral 16, 18 in FIG. 1) for processing images outputted from a display card, or processing sound outputted from a sound card, or the peripheral device can be a network card or a control card of a disk array; and a chipset 20 couples between the peripheral 16, the peripheral 18, the CPU 12 and the system memory 14 for managing data transmission between these components.

In the above-mentioned, the present chipset, serving/managing data accessing request of each peripheral, under the standards of multiple virtual channels (VCs) (like peripheral components interconnection express (PCI-E)), is capable of supporting multiple VCs (e.g., twin VCs). To manage data accessing requests of each peripheral, the chipset 20 is coupled to interface circuits 22 and 24 of each peripheral, a sequence module 28, a traffic control module 26 and buffers 30A and 30B. The buffers 30A and 30B respectively provides for the dual VCs. Also in realizing the present invention, the chipset 20 further includes an assigning module M2, an external sequence module M1, an ordering module M3, a transmission module M4 and tuning modules M5$a$, M5$b$.

In the chipset 20, each interface circuit 22 and 24 is coupled to corresponding peripheral 16 and 18 under different bus standards. For example, peripheral 16 can be a peripheral under standard of an accelerated graphic port (AGP), and the interface circuit 22 can be a AGP interface circuit. Similarly, peripheral 18 can be a peripheral under standard of a PCI-E, and the interface circuit 24 can receive/transmit PCI-E standard signals to serve the PCI-E peripheral 18. In general, access requests, information or message are exchanged under interconnection protocols, such as PCI-E, in packet format. The interface circuit 24 can process the packet after receiving from the peripheral or assemble the data/message into a packet format before transmitting to the peripheral. For example, under the standard of PCI-E, the packet includes a physical layer, a data link layer and a transaction layer. When the peripheral 18 asks a request to access the system memory space, the request is transmitted to the chipset 20 in a packet format, and the interface circuit 24 receives the packet transmitted from the peripheral and then processes the packet to extracted data of the transaction packet in the transaction layer. Hence the transaction packet includes related information of the data accessing such as the amount of data and the address the peripheral 18 requests to access, and predetermined attributes record related information such as whether or not to perform a snoop on the CPU. These transaction packets are then transmitted to the assigning module M2. On the other hand, after completing data accessing of the peripheral 18, the chipset downloads the data/message/response of the peripheral 18 via the interface circuit, after the interface circuit assembles the packet, the packet is output/downloaded to the peripheral 18.

Furthermore, the sequence module 28 and M1 can be a first in first out (FIFO) register. When the peripheral 18 requests to access the data of addresses in the system memory space, the assigning module M2 temporarily stores the access request of the peripheral 18 into the sequence modules 28 and M1, so that two different address queues can be realized to sort out the peripheral access request. The addresses of the traffic control module 26, the sequence modules 28 and M1 are uploaded to the CPU 12 and the system memory 14 respectively. During the uploading of addresses of the sequence modules 28 and M1, the ordering module M3 is capable of determining the uploading queue address of two sequence modules to perform a queue control. For example, the ordering module M3 first controls the sequence module 28 to upload the temporary stored addresses, and then allows the addresses in the sequence module M1 to be uploaded. Tuning modules M5*a* and M5*b* each coordinates and controls the uploading transmission ratio of the sequence modules 28 and M1 according to the control status of the traffic control module 26 (utilization time of receiving different signals and transmitting to the traffic control module 26). For example, when the sequence module 28 uploads the address to the CPU 12 to perform a snoop, at the same time, there may be other peripherals (such as peripheral 16) transmitting message/address to the CPU 12 via the traffic control module 26 of the chipset 20. The tuning module M5*a* determines the priority of transmissions for determining which one of the addresses of the sequence module 28 is transmitted first. When the sequence module M1 and the other peripheral, each uploads message/signal via the traffic control module 26 respectively, the tuning module M5*b* controls the transmission priority, even if the sequence module M1 transmits an address first.

After the address is uploaded and data accessing is completed, the traffic control module 26 then receives data/message responses. The data/message responses are buffered respectively into the buffer 30A, 30B. The transmission module M4 switches and selects the data/messages in the buffer 30A, 30B for downloading into the peripheral 18, and then these data/messages are processed via the interface circuit 24 and lastly transmitted to the peripheral 18.

As mentioned previously, one objective of the present invention is to utilize the hardware resources of the multiple VCs chipset to accelerate the efficiency of the data accessing when the chipset serves a peripheral of single VC.

The following example mentions how the present invention utilizes the chipset 20 of FIG. 1 to assist the single VC peripheral to perform data accessing. For example, assuming the peripheral 18 is a single VC peripheral and when the peripheral 18 accesses the system memory space, the accessing request is uploaded in a packet format to the chipset 20, and the packet is then re-packaged into a transaction layer packet. These transaction layer packets include related information of accessing request such as data of address, whether or not to snoop the CPU, etc. In the preferred embodiment of the present invention, the assigning module M2 decodes the information/attribute of the transaction layer packet according to whether there is a need to snoop the attribute data and to classify the access requests. If the accessing request of the transaction layer packet is to read data of an address of the system memory without snooping the CPU, the assigning module M2 arranges these addresses into the sequence module M1. On the other hand, if the access request of the transaction layer packet is to write data into the address of the system memory space (whether snooping/non-snooping), or to read the data of the address of the system memory while snooping, the assigning module M2 arranges these addresses into the sequence module 28. After assigning is completed, the assigning module M2 arranges the addresses required for snooping into the sequence module 18, and these addresses are then uploaded to the CPU for snooping via the traffic control module 26 by the way of FIFO, which also means checking if the data of the address is temporarily stored in the cache of the CPU 12 or not. Addresses without snooping are transmitted directly via the traffic control module 26 to the system memory 14 for performing data accessing without detouring to the CPU 12 for snooping.

As mentioned previously, data directly accessing by the system memory is faster than data accessing via snooping the CPU and the efficiency is higher. However, in the conventional chipset, even though the peripheral specifies that the data accessing does not need snooping, the chipset maintains an address queue, and still transmit the combined addresses of the address queues to the CPU to perform a snoop. In comparison to the conventional chipset, the present invention realizes the request of snooping/non-snooping to allocate the access request of the peripheral into two different address queues, thus the non-snooping access request can be forwarded to the system memory directly.

In general, in an accessing request of a single VC peripheral, a fixed order has to be maintained in between different access requests. For example, if a peripheral first requests to write data into the system memory via a single VC, and the peripheral then requests to read the data from the system memory, the chipset has to execute a write request and then executes a read request. This is known as read-in cannot pass write-in of memory order rules. Relatively, if the peripheral sends out a first request and a second request sequentially through a single VC, the second request can be processed prior to the first request. In another words, there is no ordering rule set in the single VC between different access requests. When the chipset of the present invention serves a peripheral of single virtual channel, although accessing request can be assigned respectively into different processing queues (which are also different address queue) according to the property of snooping/non-snooping, the access request sequence must still be maintained. Therefore, the ordering module M3 is utilized for maintaining the different accessing request order. For example, if a peripheral first sends out a first request which is a write-in request with snooping required, then sends a second request which is a read-in request without require snooping. Under the condition, the ordering module M3 ensures that the write address of the write-in request is transmitted to the CPU 12 by the sequence module 28; then the sequence module M1 transmits the read address of the read-in request to the system memory 14, such that the first write-in request will not be surpassed by the read-in request.

The sequence modules 28 and M1 each uploads addresses to the CPU 12 and the system memory 14 respectively. The CPU 12 and the system memory 14 perform data accessing and then generate a response after the data accessing is completed (including the access data or message of access completion). This response is downloaded back to the chipset 20 and buffered respectively to the buffers 30A and 30B via the traffic control module 26. In other words, when the chipset 20 serves a single VC peripheral, the two buffers, originally utilized for supporting double VCs, is now utilized for storing responses from the CPU and the memory temporarily. And the transmission module M4 switches the selection of downloading responses of the buffer 30A, 30B to the peripheral. In the preferred embodiment of the present invention, the transmission module M4 downloads the responses of the buffers 30A and 30B as soon as possible. For example, if the buffer 30B obtains the response of the system memory 14 first, the transmission module M4 downloads the response buffered in the buffer 30B back to the peripheral via the interface circuit 24. Furthermore, to coordinate operation of the buffers 30A and 30B, the assigning module M2 is able to assign the buffer resources in buffers 30A and 30B according to the access request. For example, if a read command request without snooping required needs to read an assigned size/capacity data from an address of the system memory space, the assigned module M2 not only assigns the address into the sequence module M1 but also allocates the buffer capacity of the buffer 30B. As a result, the buffer 30B has enough memory space to buffer the data. In the same principle, for a read command with snooping required, the assigning module M2 not only assigns the read address into the sequence module 28 but also allocates the buffer capacity of the buffer 30A.

Figure 2:
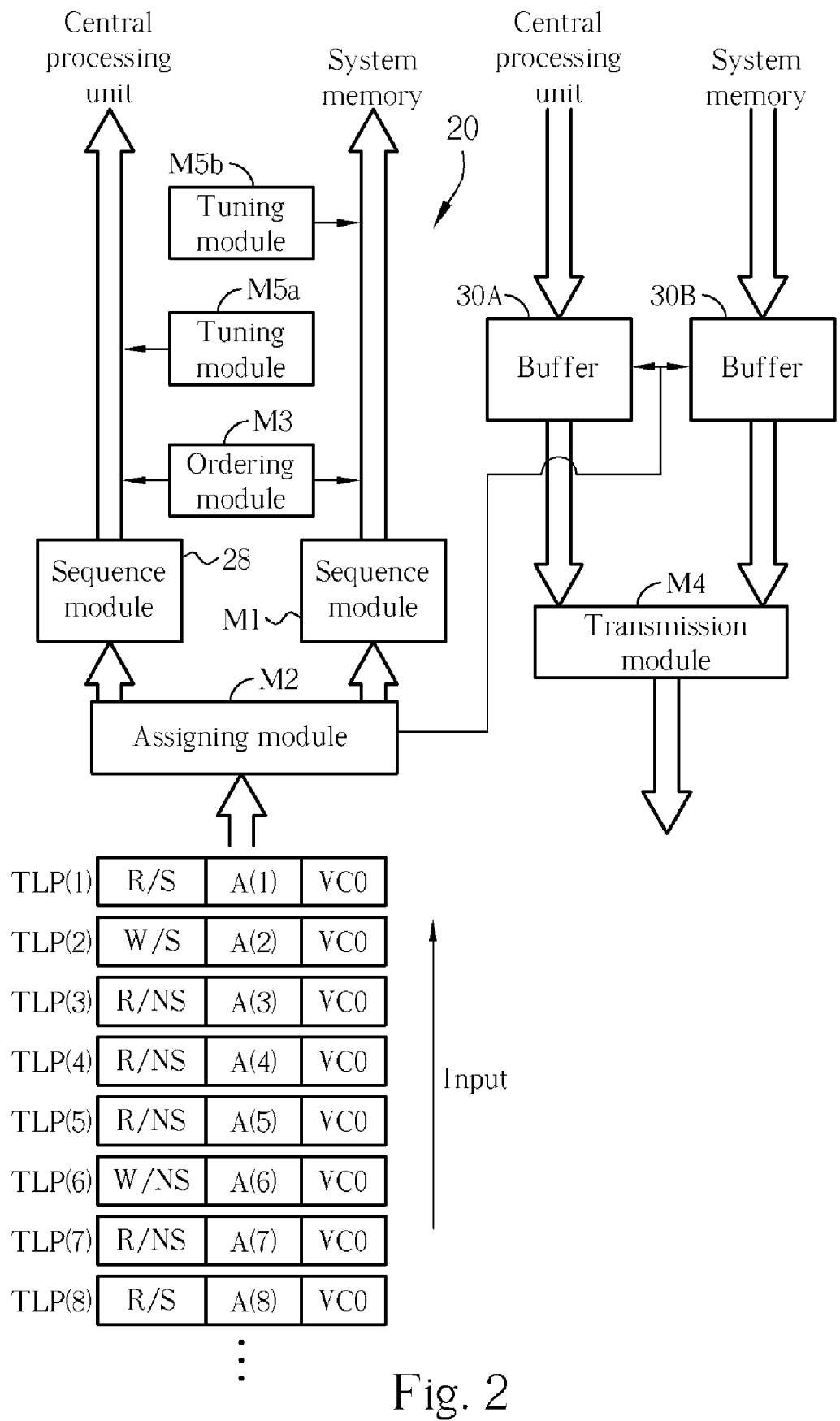
FIG. 2 to FIG. 7 illustrates a situational diagram of the chipset 20 of FIG. 1 serving a single virtual channel peripheral.

To further explain the situation of the present invention of a multiple VC chipset serving a single VC peripheral, please refer to FIG. 2 to FIG. 7 (at the same time refer to FIG. 1). FIG. 2 to FIG. 7 illustrates an operational diagram of the chipset 20 according to the present invention. Firstly, as shown in FIG. 2, if a single VC peripheral (for example peripheral 18 of FIG. 1) has a plurality of access requests uploaded in sequence, the interface circuit 24 (FIG. 1) transmits transaction layer packets TLP (1), TLP (2) through to TLP (7) of the access request sequentially to the assigning module M2. These transaction layer packets record the related information of the access requests. As shown in FIG. 2, the transaction layer packet TLP (1) requests to read address region A (1) of the system memory space and also to perform a snoop (as shown on FIG. 1 labeled as R/S, reading and snooping). The transaction layer packet TLP (2) requests to write data into address region A (2) and to perform a snoop (labeled as W/S, writing and snooping). The transaction layer packets TLP (3) through to TLP (5) respectively requests to read address region A (3) through to A (5) without snooping (labeled as R/NS, reading/non-snooping). The transaction layer packet TLP (6) requests to write data into address region A (6) without snooping (labeled as W/NS, writing/non-snooping). The rest may be deduced by analogy, the transaction layer packet TLP (7) is a read request without snooping. As these transaction layer packets are sent out by the single VC peripheral, therefore, these transaction layer packets are recorded in a single virtual channel VC0.

Figure 3:
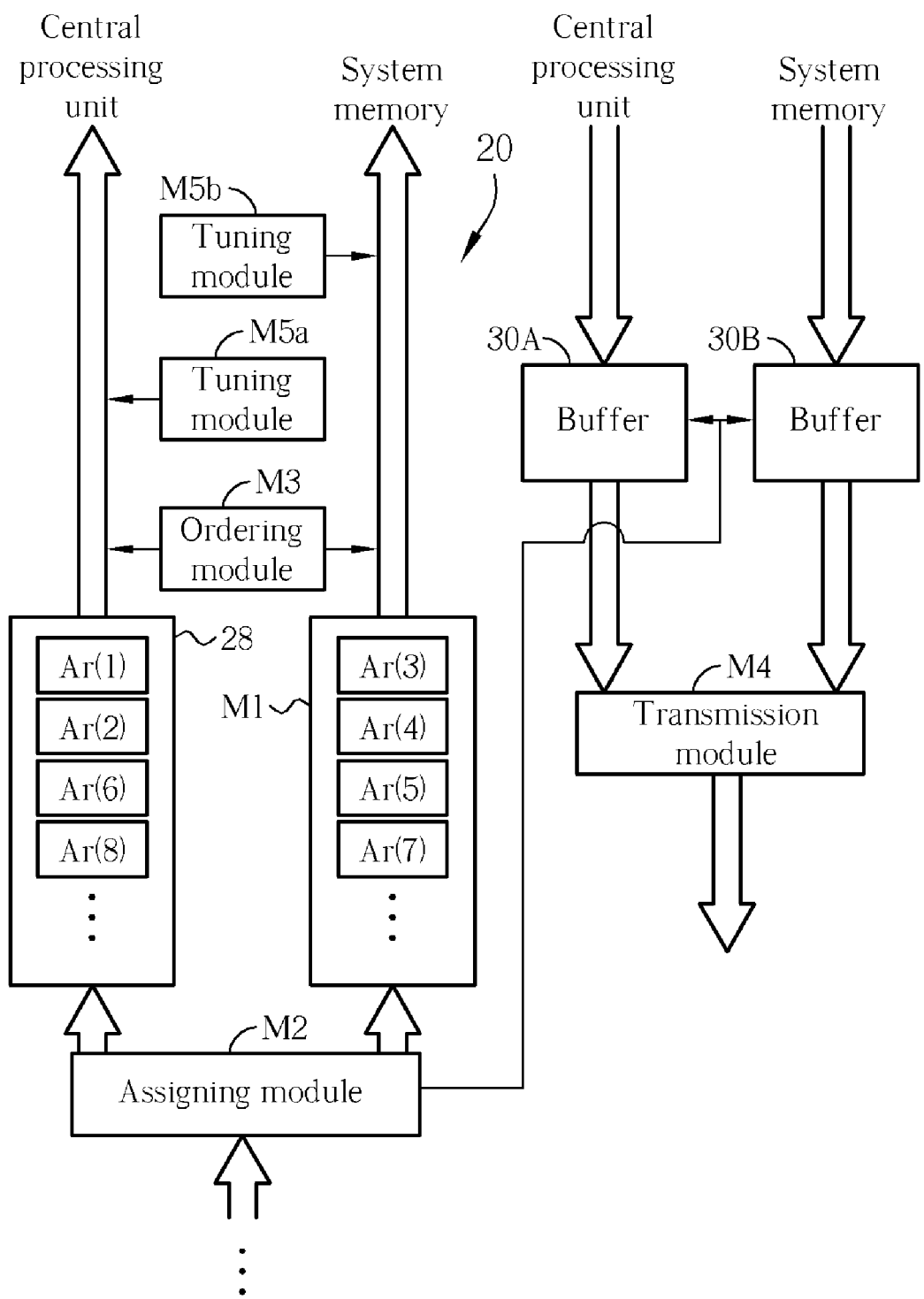

To continue the example in FIG. 2, please refer to FIG. 3. As shown in FIG. 3, after the assigning module M2 receives each transaction layer packet TLP (1) through to TLP (7), the assigning module M2 sequentially assigns the address corresponding to each access request respectively into different address queues according to the attribute of snooping or non-snooping status of each accessing request. As the transaction layer packets TLP (3) through to TLP (5), and TLP (7) are reading without snooping requests, therefore the related addresses Ar (3) through to Ar (5), and Ar (7) and so on are assigned into the sequence module M1 sequentially. Related addresses of the other transaction layer packets Ar (1), Ar (2), Ar (6), Ar (8) and so on are assigned into to the sequence model 28 (although Ar (6) is read without-snoop, it is still assigned into the sequence module 28 for the CPU). Address Ar (n) is generated according to address region A (n) recorded by each transaction layer packet TLP (n).

Figure 4:
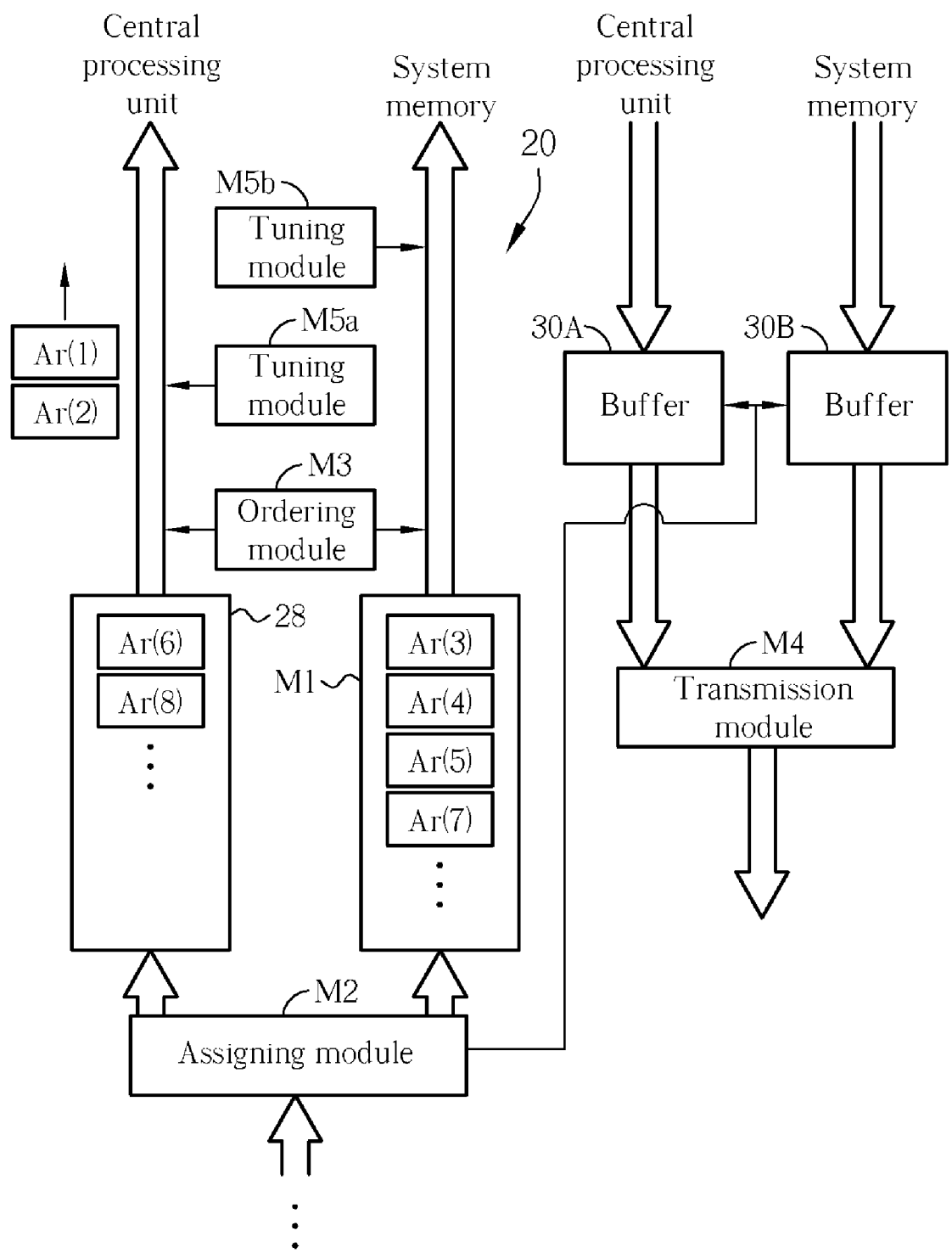
Figure 5:
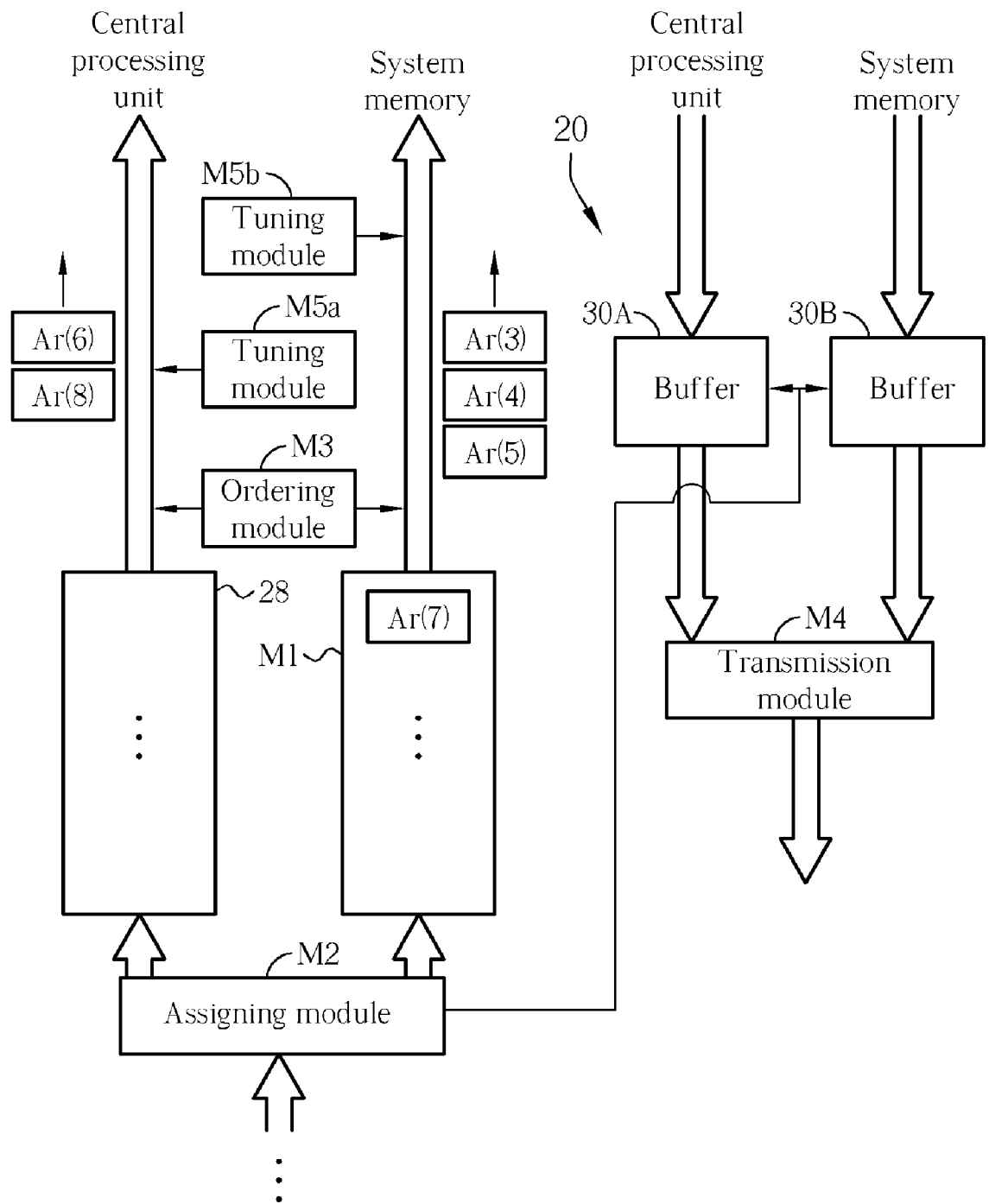

To continue the situation of FIG. 3, please refer to FIG. 4. As shown in FIG. 4, each address assigned into the sequence modules 28 and M1 is transmitted to the CPU 12 and the system memory 14 respectively. As previously mentioned, the transaction layer packets in the single VC must maintain its suitable order. When transaction layer packet TLP (2) compared to transaction layer packet TLP (3) is sent out earlier and also has a higher order (transaction layer packet TLP (2) is a write-in, and transaction layer packet TLP (3), a read-in, cannot pass a write-in), therefore addresses Ar (1), Ar (2) of the sequence model 28 have a higher priority than the addresses Ar (3) through to Ar (5) of the sequence module M1. The ordering module M3 allows the sequence module 28 to transmit the addresses Ar (1), Ar (2) to the CPU 12 first; at the same time the addresses of Ar (3) through to Ar (5) of the sequence module M1 cannot be transmitted yet. As shown in FIG. 5, after transmitting addresses Ar (1), Ar (2) to the CPU 12, the ordering module M3 then allows the sequence module M1 to transmit addresses Ar (3) through to Ar (5) to the system memory 14; and lastly the sequence module 28 transmits addresses Ar (6) and Ar (8) to the CPU 12. Similarly, in order to maintain the ordering sequence, after the ordering module M3 transmits address Ar (6) to the CPU 12, then the sequence module M1 is allowed to transmit address Ar (7) to the system memory 14.

Figure 6:
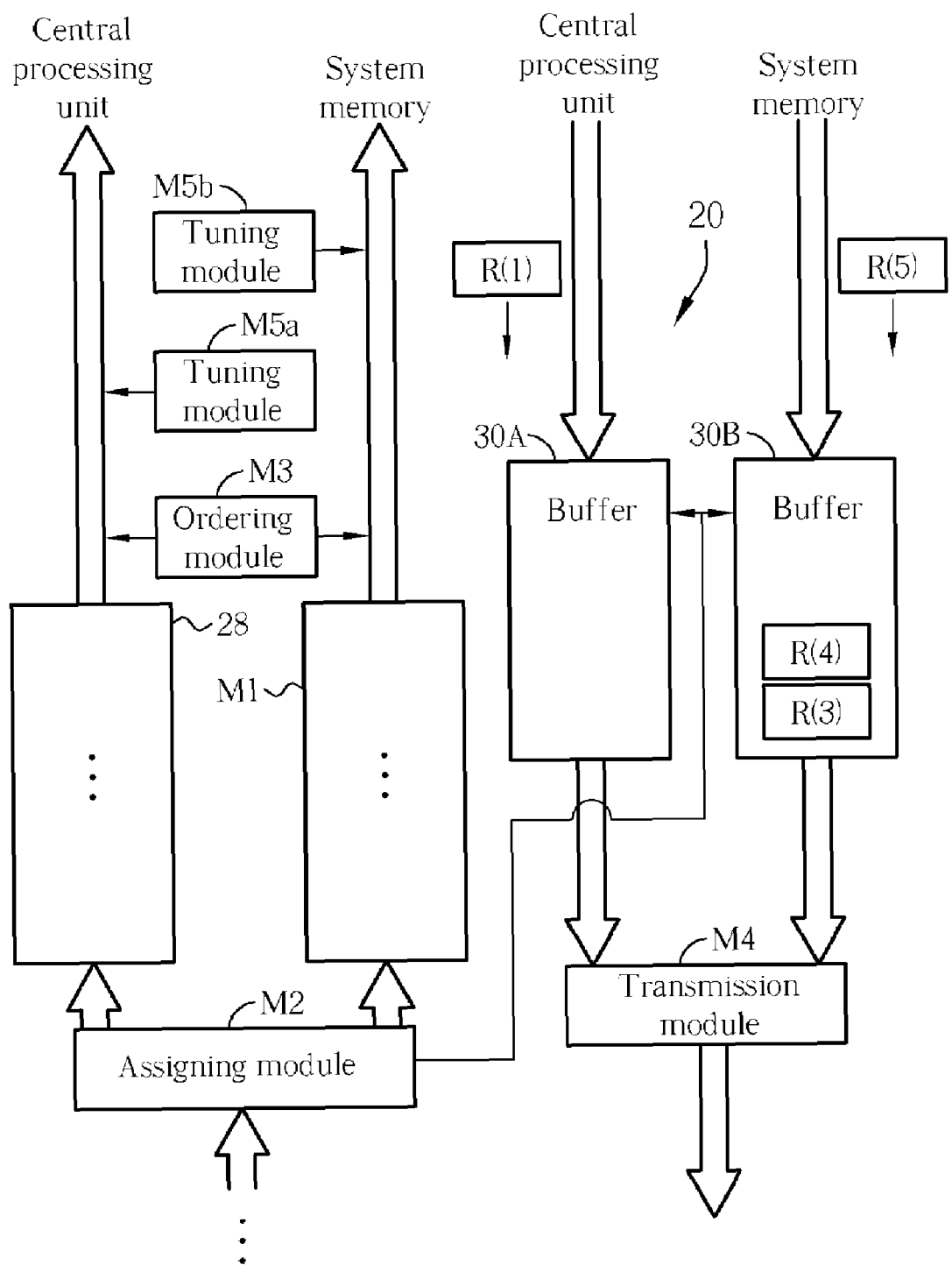
Figure 7:
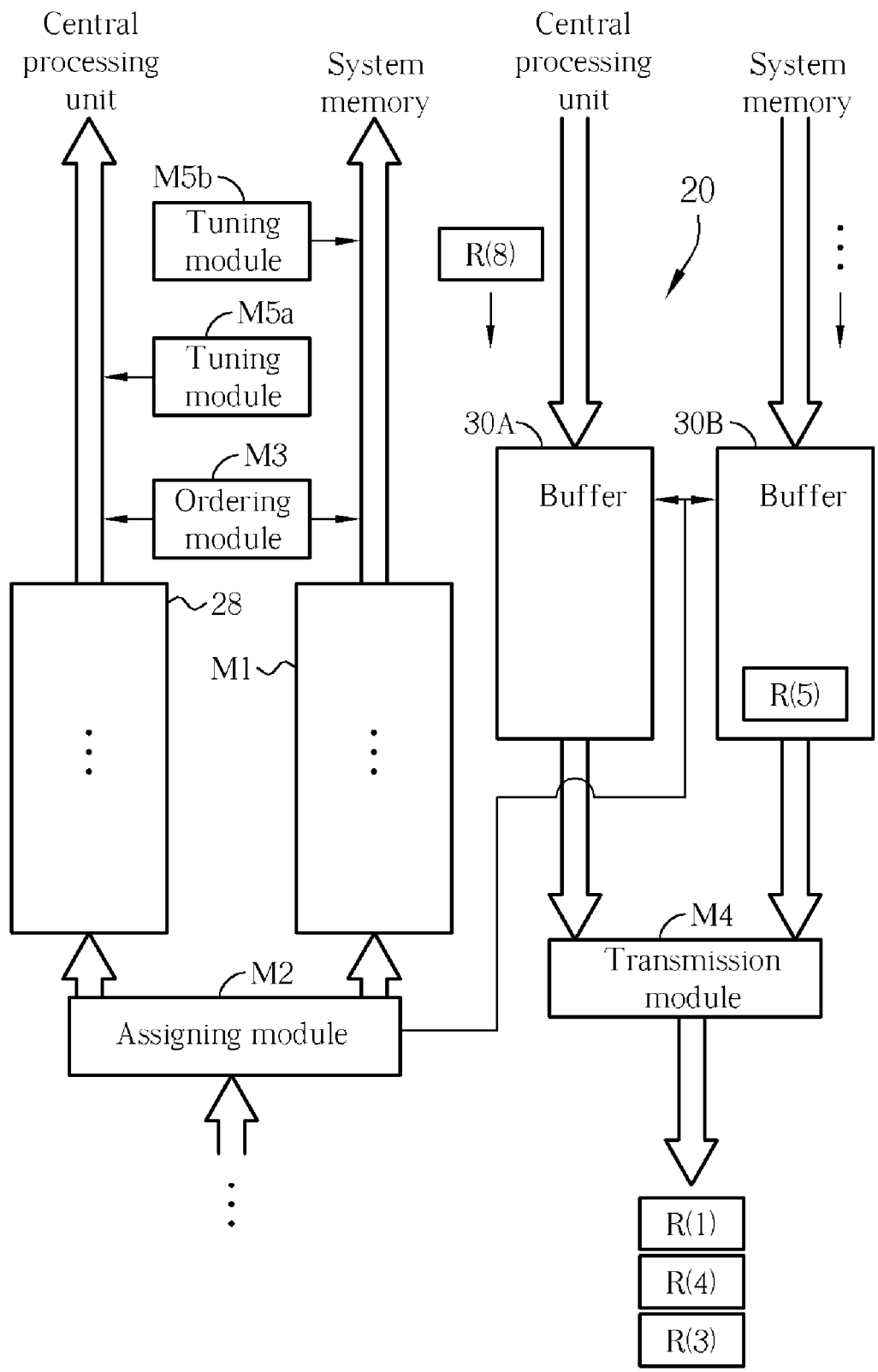

When the address of each access request is transmitted to the CPU 12 and the system memory 14 respectively, the CPU 12 and the system memory 14 perform the corresponding data accessing. The CPU 12 inspects the data of these addresses read into the cache. If cache accessed is needed, an access cycle is sent to the system memory 14 to access the cache. The address transmitted directly from the sequence module M1 to the system memory 14 can be accessed directly from the system memory 14. After the CPU/memory completes accessing, the response of the access is transmitted back to the chipset 20. For example, if the accessing request needs to read data, the CPU/memory will respond to reading the data; or after reading, the CPU/memory will respond with a completion message. As shown in FIG. 6, after the chipset 20 receives the response, the response from the CPU is temporarily buffered in the buffer 30A; after the system memory 14 receives the response, the response is temporarily buffered in the buffer 30B. As data accessing of the system memory 14 is performed at a faster speed, therefore the system memory 14 may transmit the response of the data accessing back to the chipset 20 faster. In FIG. 6, the system memory 14 continuously transmits the responses R(3) through to R(5) of the transaction layer packets back to the buffer 30B. At the same time, the CPU 12 transmits the response R(1) of the transaction layer packet TLP (1) back to the buffer 30A. And the transmission module M4 outputs the responses of the buffers 30A and 30B in sequence via the interface circuit (FIG. 1) and then downloads the responses to the peripheral. As there is no order to be considered between each response, basically the transmission module M4 may select any of the two buffers to output its response, so that the peripheral can obtain the response as soon as possible. As shown in FIG. 7, if the responses R(3) and R(4) are already buffered in the buffer 30B, the transmission module M4 transmits the responses R(3) and R(4) back to the peripheral first, and then transmits the response R(1) in the buffer 30A. If the following response R(5) is already buffered in the buffer 30B, the transmission module M4 selects to output the response by the buffer 30B. The procedure of the above-mentioned will be applied to each transaction layer packet, therefore the chipset 20 can complete serving each transaction layer packet.

Figure 8:
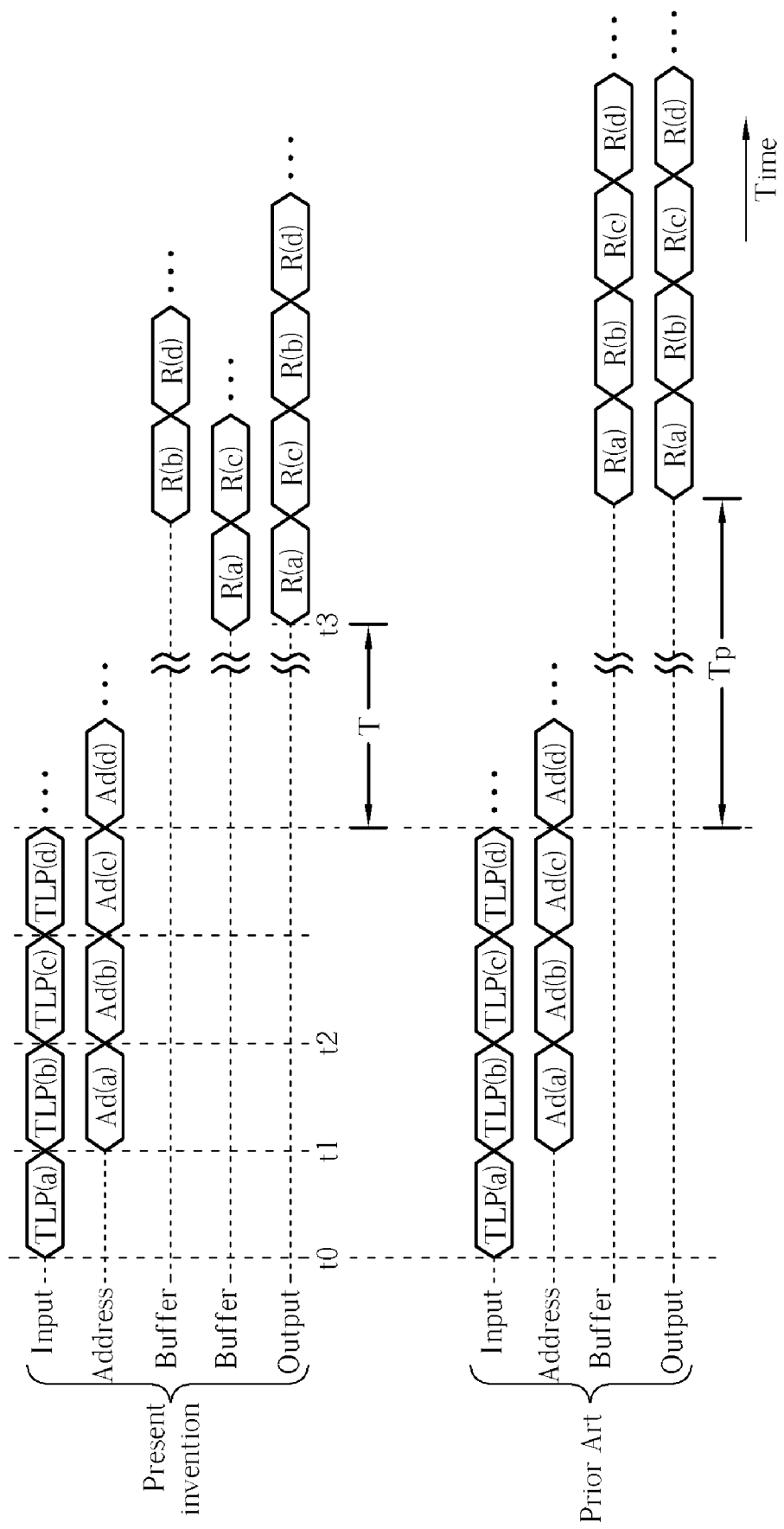
FIG. 8 illustrates a time sequence diagram of the chipset 20 of FIG. 1 serving a single virtual channel peripheral.

Please refer to FIG. 8 (and FIG. 1). FIG. 8 illustrates a time sequence diagram of related data signal when a chipset 20 (FIG. 1) is serving a single virtual channel peripheral; vertical axis of FIG. 8 is the time. When the chipset 20 receives an accessing request from the peripheral, transaction layer packet of the accessing request is extracted to find out which data in which address of the system memory space is needed by the peripheral according to the content of the transaction layer packet. In FIG. 8, at time t0, the chipset 20 begins to obtain transaction layer packets TLP (a), TLP (b), TLP (c), TLP (d) and so on sequentially. At time t1, the chipset 20 obtains the integrated content of the transaction layer packet TLP (a), and address Ad (a) of the access request is known. Under the same principle, at time t2, the chipset 20 obtains the integrated content of the transaction layer packet TLP (b), and address Ad (b) of the accessing request is known and so forth. The assigning module M2 (FIG. 1) assigns the address corresponding to each transaction layer packet into the sequence module 28 or M1 (FIG. 1) according to the snooping attribute of each transaction layer packet. In FIG. 8, supposing the transaction layer packets TLP (a), TLP (c) are non-snooping read-in accessing requests, and the transaction layer packets TLP (b), TLP (d) are snooping read-in accessing requests. Under this situation, addresses Ad (a), Ad (c) of the transaction layer packets TLP (a), TLP (c) are transmitted directly to the memory 14 (FIG. 1) via the sequence module M1. Relatively, addresses of Ad (b), Ad (d) of the transaction layer packets TLP (b), TLP (d) are transmitted to the CPU 12 via the sequence module 28. As previously discussed, the system memory 14 is respond to the accessing request faster comparatively than the CPU. Therefore the system memory 14 can respond faster to the access request of the transaction layer packets TLP (a), TLP (c) and the corresponding responses R(a), R(c) will then be downloaded to the chipset 20, and the chipset 20 will then buffer the responses into the buffer 30B. The other buffer 30A obtains the responses R(b), R(d) from the CPU later. When there is response data buffered in the buffers 30A and 30B, the transmission module M4 downloads these responses to the peripheral as soon as possible. As shown in FIG. 8, the transmission module M4 can download the responses R(a), R(c) of the buffer 30B first at time t3, and then switches to download the responses R(b), R(d) of the buffer 30A.

For the convenience of comparing the present invention with the prior art, FIG. 8 also illustrates the sequence of the prior art performing data accessing under the same situation. In this present invention, non-snooping accessing requests can be processed directly by the memory for a faster response and a more efficient data accessing as shown in time interval T of FIG. 8. In comparison, the prior art can only maintain a single address queue, thus, the address of the access request in the transaction layer packet is integrated and transmitted to the CPU. Because the prior art needs to detour to the CPU to perform data accessing, therefore there is a longer delay (latency) before obtaining the response, as shown in time interval Tp.

Figure 9:
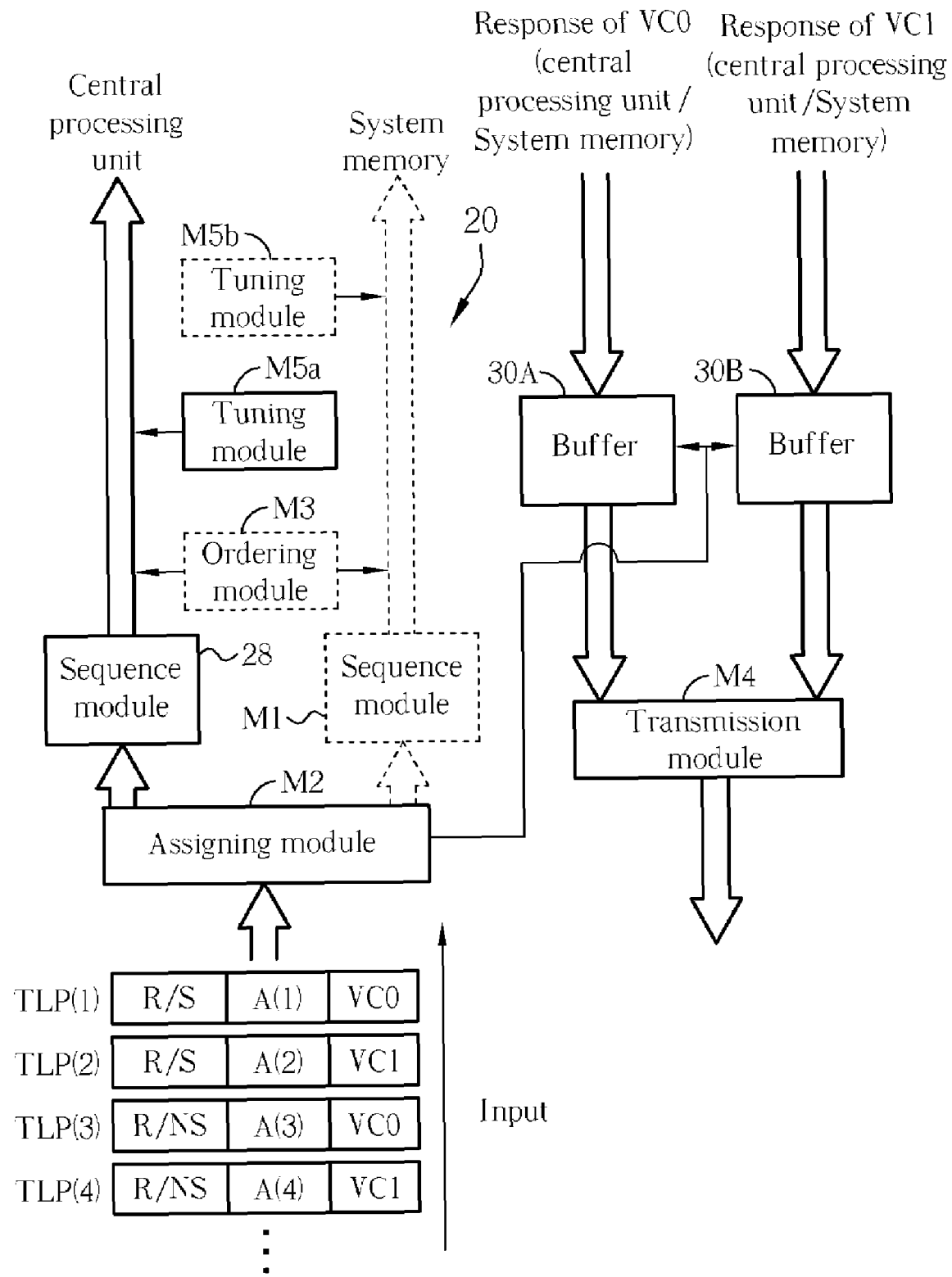
FIG. 9 illustrates a situational diagram of a chipset 20 of FIG. 1 serving a multiple virtual channels peripheral.

Please refer to FIG. 9 (and FIG. 1). FIG. 2 to FIG. 8 discusses the situation of a multiple virtual channel chipset of the present invention serving a single virtual channel peripheral. FIG. 9 illustrates a situation of a chipset 20 of the present invention when serving a multiple VCs peripheral. As shown in FIG. 9, when the peripheral is a multiple VCs peripheral, therefore the transaction layer packet of an accessing request labels the VC of the packet. In FIG. 9, one transaction layer packet labeled VC0 belongs to a same virtual channel, another transaction layer packet labeled VC1 belongs to another virtual channel. After receiving each transaction layer packet, the assigning module M2 unifies the sequence module 28 to sort accessing addresses of the corresponding the transaction layer packets; and then uploading transaction layer packets sequentially. Thus the ordering module M3 and the tuning module M5b stop operating. Responses of data accessing are buffered into the buffers 30A and 30B respectively according to the corresponding virtual channels. For example, the responses obtained by the transaction layer packet of the virtual channel VC0 is buffered to the buffer 30A, and the responses corresponding to the transaction layer packet of the virtual channel VC1 is buffered to the buffer 30B. These buffered responses are downloaded to the peripheral via the arrangement of the transmission module M4.

Generally speaking, when the peripheral and the chipset connect and operate (like booting), a hand-shaking procedure is carried out to determine whether the opposite party can support multiple virtual channels. The chipset of the present invention in this procedure can determine whether to support a peripheral of multiple virtual channels, or to serve a single virtual channel peripheral utilizing resources of the multiple virtual channels.

In conclusion, as known to those in the prior art, when the chipset of multiple virtual channels serves a peripheral of a single virtual channel, it is unable to efficiently utilize the additional hardware resource for the multiple virtual channels in the chipset; also it is unable to improve on the efficiency of data accessing. In comparison, the present invention determines whether to perform a snoop and to distribute the path of data accessing according to the access request, the data accessing request that does not require snooping will be processed directly by the system memory, and the additional hardware resource of the multiple virtual channels can be utilized for buffering. Therefore the present invention not only fully utilizes the hardware resource of the multiple virtual channels to serve the peripheral of the single virtual channel, and also improves the actual efficiency of the whole computer system. In this present invention, each module of the chipset can be implemented through either firmware or hardware, for example, the function of the assigning module M2 can be implemented utilizing logic circuit hardware.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for data accessing, the method comprising:
receiving a plurality of transaction layer packets sequentially, each transaction layer packet recording an attribute;
accessing a plurality of components corresponding to the attribute of each transaction layer packet, wherein a sequence control step is included to receive data accessing of a write-in transaction layer packet first before receiving data accessing of a read-in transaction layer packet, wherein the attribute of the write-in transaction layer packet indicates snooping the CPU, and the attribute of the read-in transaction layer packet indicates an opposite attribute of the attribute of the write-in transaction layer packet; and temporarily storing data accessed from different components respectively in different buffers of the computer system so that a buffer does not store data of different components;

wherein the data is served between a chipset having multiple virtual channels, a peripheral having a single virtual channel, and the components.

2. The method of claim 1 wherein the components are a central processing unit (CPU) and a system memory.

3. The method of claim 2 further comprising:

accessing the system memory alternatively if the CPU does not have the data required for access when the CPU is accessed.

4. A chipset for serving data accessing between a peripheral with single virtual channel and a plurality of components, the chipset comprising:

an assigning module for receiving a plurality of transaction layer packets sequentially and outputting the transaction layer packets to different output ports according to attributes recorded in each transaction layer packet;

a plurality of sequence modules, coupled to the corresponding component respectively, wherein after receiving the corresponding transaction layer packet outputted from different output ports of the assigning module, the transaction layer packet is transmitted to the corresponding component;

an ordering module for controlling sequence of the sequence modules transmitting to the corresponding components, wherein when the ordering module controls the sequence of the sequence modules transmitting to the corresponding components, the assigning module first receives data accessing of a write-in transaction layer packet before receiving data accessing of a read-in transaction layer packet, wherein the attribute of the write-in transaction layer packet indicates snooping the CPU, and the attribute of the read-in transaction layer packet indicates an opposite attribute of the attribute of the write-in transaction layer packet; and a plurality of buffers for temporarily storing data accessed from different components so that a buffer does not store data of different components;

wherein the chipset supports multiple virtual channels.

* * * * *